(12) United States Patent
Isaka et al.

(10) Patent No.: US 8,388,845 B2
(45) Date of Patent: Mar. 5, 2013

(54) WASTEWATER TREATMENT METHOD AND WASTEWATER TREATMENT APPARATUS

(75) Inventors: Kazuichi Isaka, Tokyo (JP); Yuya Kimura, Tokyo (JP); Tatsuo Sumino, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 388 days.

(21) Appl. No.: 12/720,731

(22) Filed: Mar. 10, 2010

(65) Prior Publication Data

US 2010/0230348 A1 Sep. 16, 2010

(30) Foreign Application Priority Data

Mar. 13, 2009 (JP) ................................. 2009-061189

(51) Int. Cl.
 *C02F 3/30* (2006.01)
(52) U.S. Cl. ...... 210/630; 210/615; 210/150; 210/221.2
(58) Field of Classification Search .................. 210/605, 210/614, 615, 616, 630, 143, 150, 151, 220, 210/221.1, 221.2, 260, 903
See application file for complete search history.

(56) References Cited

U.S. PATENT DOCUMENTS

| | | | |
|---|---|---|---|
| 7,001,519 B2 * | 2/2006 | Linden et al. ................. | 210/602 |
| 2006/0191846 A1 | 8/2006 | Sumino et al. | |
| 2007/0218537 A1 | 9/2007 | Furukawa et al. | |

FOREIGN PATENT DOCUMENTS

| | | |
|---|---|---|
| JP | 2001-293494 | 10/2001 |
| JP | 2002-224688 | 8/2002 |
| JP | 2006-247624 | 9/2006 |

OTHER PUBLICATIONS

K. A. Third et al.; The Canon System 9Completelly Autotrophic Nitrogen-removal Over Nitrite) under Ammonium Limitation: Interaction and Competition between Three Groups of Bacteria; System. Appl. Microbiol. 24, 2001, pp. 588-596; http://www.urbanfischer.de/journals/sam.
Y. Date et al., Microbial Community of Anammox Bacteria Immobilized in Polyethylene Glycol Gel Carrier, Water Science & Technology, vol. 58, 2008, pp. 1121-1128. Isaka et al., Ammonium Removal Performance of Anaerobic Ammonium-Oxidizing Bacteria Immobilized in Polyethylene Glycol Gel Carrier, Appl. Microbiol. Biotechnol. vol. 76, 2007, pp. 1457-1465.
Dutch Novelty Search Report dated Oct. 6, 2010 with partial translation.
JP Office Action of Appln. No. 2009-061189 dated Oct. 10, 2012 with English translation.

\* cited by examiner

*Primary Examiner* — Fred Prince
(74) *Attorney, Agent, or Firm* — Antonelli, Terry, Stout & Kraus, LLP.

(57) ABSTRACT

An aspect of the present invention provides a wastewater treatment method for treating wastewater containing ammonium nitrogen, including the steps of: oxidizing the ammonium nitrogen in the wastewater to nitrite with nitrifying bacteria in a treatment tank in which the nitrifying bacteria and anaerobic ammonium-oxidizing bacteria having a half-saturation constant of 6.1 mgN/L or more with respect to nitrite coexist; and denitrifying the nitrite formed through the oxidation of the ammonium nitrogen, with the anaerobic ammonium-oxidizing bacteria in the treatment tank, while using the ammonium nitrogen contained in the wastewater as a hydrogen donor. The method employs the anaerobic ammonium-oxidizing bacteria that can maintain the denitrification activity even under a condition in which the amount of dissolved oxygen is large, consequently can easily maintain the activities of both of the nitrifying bacteria and the anaerobic ammonium-oxidizing bacteria which coexist in the same treatment tank, and can rapidly perform wastewater treatment.

16 Claims, 6 Drawing Sheets

WATER QUALITY OF AMMONIUM WASTEWATER (PER 100 L)

| | |
|---|---|
| $(NH_4)_2SO_4$ | 330 g |
| $MgSO_4 \cdot 7H_2O$ | 25 g |
| $CaCl_2 \cdot 2H_2O$ | 7.2 g |
| $NaHCO_3$ | 410 g |
| $Na_2HPO_4 \cdot 2H_2O$ | 35 g |
| $NaCl$ | 15 g |
| $KCl$ | 7.2 g |

| (NH$_4$)$_2$SO$_4$ | 70~430 mg/L as N |
| --- | --- |
| NaNO$_2$ | 70~570 mg/L as N |
| MgSO$_4$·7H$_2$O | 30 mg/L |
| CaCl$_2$·2H$_2$O | 18 mg/L |
| NaHCO$_3$ | 500 mg/L |
| NaHPO$_4$ | 2.7 mg/L |

|  | HALF-SATURATION CONSTANT (mgN/L) |
|---|---|
| CARRIER A | 15 |
| CARRIER B | 6.1 |
| CARRIER C | 40 |
| CARRIER D | 28 |
| SLUDGE E | – |

WASTEWATER TREATMENT METHOD AND WASTEWATER TREATMENT APPARATUS

BACKGROUND OF THE INVENTION

1. Field of the Invention

The present invention relates to a wastewater treatment method and a wastewater treatment apparatus, and particularly relates to a method for treating wastewater containing ammonium nitrogen and a treatment apparatus therefor.

2. Description of the Related Art

In recent years, a method including denitrification treatment with the use of anaerobic ammonium-oxidizing bacteria (anaerobic ammonium oxidation method) has drawn attention as a method for treating wastewater containing ammonium nitrogen. This method includes nitriting the ammonium nitrogen in the wastewater into nitrite with nitrifying bacteria in a nitrification tank, and then simultaneously denitrifying the nitrite and the ammonium nitrogen in the wastewater in the denitrification tank with the anaerobic ammonium-oxidizing bacteria. The method does not need the supply of an organic substance from the outside for a denitrification reaction, and accordingly can efficiently perform wastewater treatment.

A simultaneous denitrification reaction in an anaerobic ammonium oxidation method proceeds according to the following reaction formula. Accordingly, in order to reliably decompose and remove the ammonium nitrogen in the wastewater, it is necessary to control the ratio of the ammonium nitrogen and the nitrite nitrogen in the denitrification tank based on the stoichiometric ratio in the following reaction formula. For this reason, the nitrification rate in the nitrification tank has been needed to be strictly controlled.

$$1.00NH_4 + 1.32NO_2 + 0.066HCO_3 + 0.13H^+ \rightarrow 1.02N_2 + 0.26NO_3 + 0.066CH_2O_{0.5}N_{0.15} + 2.03H_2O$$

Then, a method (so-called CANON method) is proposed which allows both of the nitrification reaction and the denitrification reaction to proceed in the treatment tank in which the nitrifying bacteria and the anaerobic ammonium-oxidizing bacteria coexist, under an aerobic condition (Japanese Patent Application Laid-Open No. 2001-293494 and Third, K. A., Slickers, A. O., Kuenen, J. G., Jetten, M. S. M., 2001 The CANON system (completely autotrophic nitrogen-removal over nitrite) under ammonium, limitation: interaction and competition between three groups of bacteria. Syst. Appl. Microbiol. 24(4), 588-596, for instance). This method can reliably decompose and remove the ammonium nitrogen in the wastewater even without strictly controlling the nitrification rate because the nitrifying bacteria and the anaerobic ammonium-oxidizing bacteria which coexist in the same treatment tank tend to keep balance with each other.

SUMMARY OF THE INVENTION

However, it has been difficult for the conventional CANON method to maintain the activities of both of nitrifying bacteria and anaerobic ammonium-oxidizing bacteria which coexist in the same treatment tank, and accordingly to rapidly perform the wastewater treatment.

For instance, the methods described in Japanese Patent Application Laid-Open No. 2001-293494 and Third, K. A., Slickers, A. O., Kuenen, J. G., Jetten, M. S. M., and 2001 The CANON system (completely autotrophic nitrogen-removal over ammonium, limitation: interaction and competition between three groups of bacteria. Syst. Appl. Microbiol. 24 (4), 588-596 include treating wastewater under an aerobic condition for the purpose of activating nitrifying bacteria which are aerobic bacteria, and accordingly a problem is to lower the denitrification activity of the anaerobic ammonium-oxidizing bacteria which are anaerobic bacteria.

The present invention has been made in view of the above described circumstances, and an object thereof is to provide a wastewater treatment method and a wastewater treatment apparatus which can rapidly perform wastewater treatment with the use of nitrifying bacteria and anaerobic ammonium-oxidizing bacteria that coexist in the same treatment tank.

A wastewater treatment method according to the present invention is a method for treating wastewater containing ammonium nitrogen, including the steps of: oxidizing the ammonium nitrogen in the wastewater to nitrite with nitrifying bacteria in a treatment tank in which the nitrifying bacteria and anaerobic ammonium-oxidizing bacteria having a half-saturation constant of 6.1 mgN/L or more with respect to nitrite coexist; and denitrifying the nitrite formed through the oxidation of the ammonium nitrogen, with the anaerobic ammonium-oxidizing bacteria in the treatment tank, while using the ammonium nitrogen contained in the wastewater as a hydrogen donor.

Here, in the present invention, the "half-saturation constant (mgN/L) with respect to nitrite" of anaerobic ammonium-oxidizing bacteria is the Michaelis constant which is obtained by approximating the relationship between the concentration (mgN/L) of nitrite nitrogen that is a substrate and the rate of consumption (mgN/L/hr) of nitrite nitrogen by anaerobic ammonium-oxidizing bacteria, according to the Michaelis-Menten equation. The "half-saturation constant" is specifically represented by a half-saturation constant (Michaelis constant) determined in the method described in Example 1, which will be described later.

Conventionally known anaerobic ammonium-oxidizing bacteria have too small a half-saturation constant with respect to nitrite to determine because of the precision of an analytical instrument. In such circumstances, the present inventors have conducted an extensive investigation, and as a result, have found that there exist anaerobic ammonium-oxidizing bacteria which have a very high half-saturation constant (6.1 mgN/L or more) compared to conventional ones. Furthermore, the present inventors have acquired the finding that such anaerobic ammonium-oxidizing bacteria can maintain denitrification activity even under a condition in which the amount of dissolved oxygen (DO) is large. The above described wastewater treatment method is based on the above described findings of the present inventors.

The above described wastewater treatment method employs the anaerobic ammonium-oxidizing bacteria that can maintain the denitrification activity even under a condition in which the amount of dissolved oxygen is large, consequently can easily maintain the activities of both of the nitrifying bacteria and the anaerobic ammonium-oxidizing bacteria which coexist in the same treatment tank, and can rapidly perform wastewater treatment.

In the wastewater treatment method, the concentration of the nitrite in the treatment tank is preferably maintained at 15 mg/L or more and 250 mg/L or less.

In the wastewater treatment method, the concentration of ammonium in the treatment tank is preferably maintained at 3 mg/L or more.

By maintaining the concentrations of nitrite and ammonium in the treatment tank in the above described range, the rate of wastewater treatment can be further enhanced.

In the wastewater treatment method, the nitrifying bacteria preferably have a half-saturation constant of 15 mgN/L or more with respect to ammonium.

Here, in the present invention, the "half-saturation constant (mgN/L) with respect to ammonium" of nitrifying bacteria is the Michaelis constant which is obtained by approximating the relationship between the concentration (mgN/L) of ammonium nitrogen that is a substrate and the rate of consumption (mgN/L/hr) of ammonium nitrogen by nitrifying bacteria according to the Michaelis-Menten equation. The "half-saturation constant" is specifically represented by a half-saturation constant (Michaelis constant) determined in the method described in Example 1, which will be described later.

When nitrifying bacteria having a low half-saturation constant with respect to ammonium is used, ammonium in a treatment tank is excessively consumed in a nitrification reaction, which may affect a denitrification reaction with anaerobic ammonium-oxidizing bacteria. By using nitrifying bacteria having a half-saturation constant of 15 mgN/L or more with respect to ammonium, an excessive consumption of ammonium in a nitrification reaction is prevented, and a denitrification reaction with the anaerobic ammonium-oxidizing bacteria can be allowed to stably proceed.

In the wastewater treatment method, the nitrifying bacteria and the anaerobic ammonium-oxidizing bacteria are preferably immobilized on different carriers from each other.

Then, the method can easily control the bacterial loads of the nitrifying bacteria and the anaerobic ammonium-oxidizing bacteria by adjusting the volume ratio of the nitrification carrier having the nitrifying bacteria immobilized thereon and the denitrification carrier having the anaerobic ammonium-oxidizing bacteria immobilized thereon.

In particular, the carrier is preferably entrapping immobilization pellets.

When entrapping immobilization pellets are employed as the carrier, the peeling of the biofilm does not occur, which can occur in the case of attachment immobilization pellets, so the bacterial load can be reliably controlled.

A wastewater treatment apparatus according to the present invention includes a treatment tank in which nitrifying bacteria and anaerobic ammonium-oxidizing bacteria having a half-saturation constant of 6.1 mgN/L or more with respect to nitrite coexist.

In the wastewater treatment apparatus, the nitrifying bacteria preferably have a half-saturation constant of 15 mgN/L or more with respect to ammonium.

In the wastewater treatment apparatus, the nitrifying bacteria and the anaerobic ammonium-oxidizing bacteria are preferably immobilized on different carriers from each other.

In the wastewater treatment apparatus, the carrier is preferably entrapping immobilization pellets.

The wastewater treatment method according to the present invention can easily maintain the activities of both of the nitrifying bacteria and the anaerobic ammonium-oxidizing bacteria which coexist in the same treatment tank, by employing anaerobic ammonium-oxidizing bacteria having a half-saturation constant of 6.1 mgN/L or more with respect to nitrite. Accordingly, the method can rapidly perform wastewater treatment.

DETAILED DESCRIPTION OF THE PREFERRED EMBODIMENTS

The embodiments according to the present invention will be described below with reference to the attached drawings.

Figure 1:
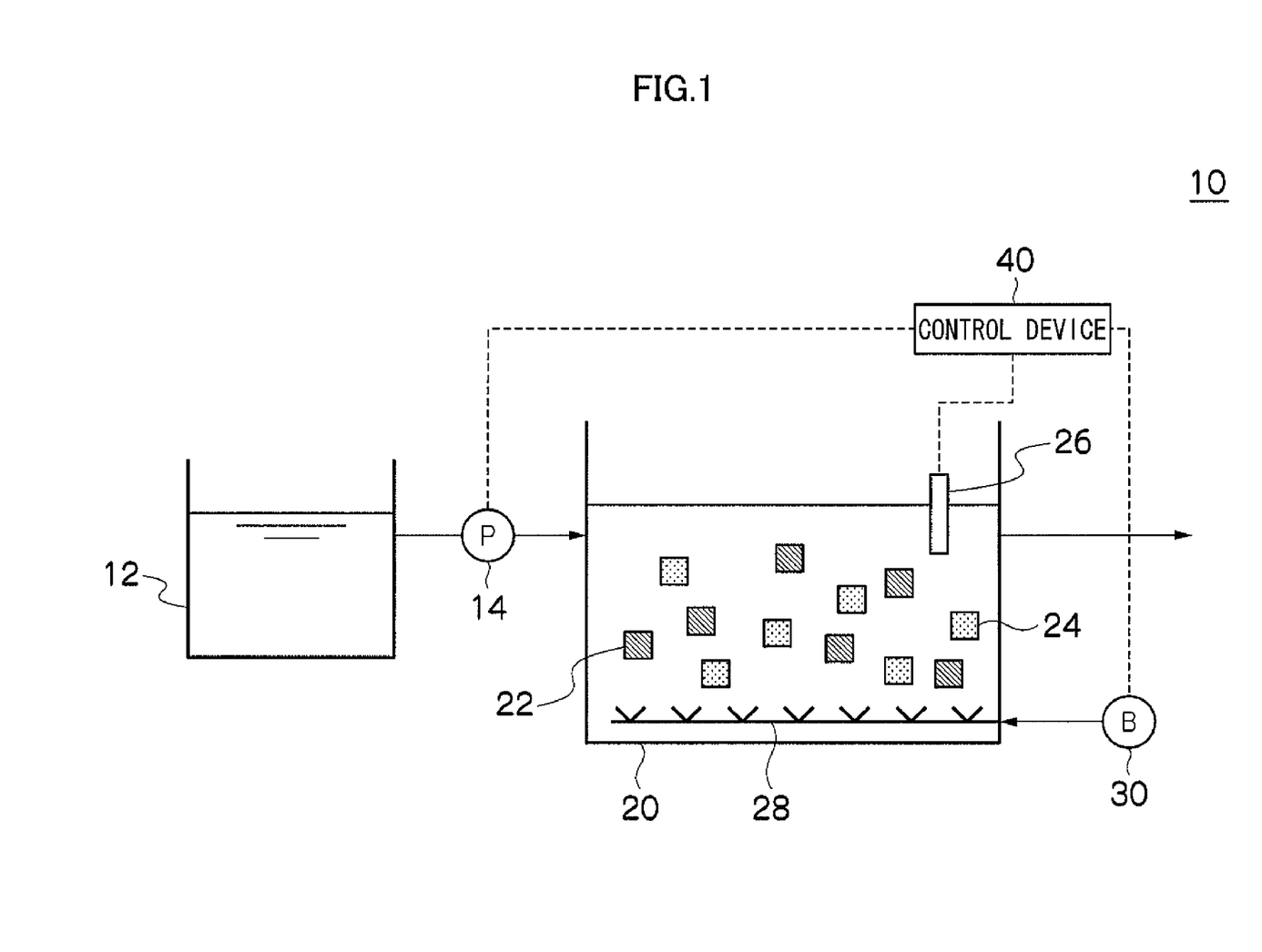
FIG. 1 is a block diagram illustrating one example of a wastewater treatment apparatus according to the present invention.

FIG. 1 is a block diagram illustrating one example of a wastewater treatment apparatus according to the present embodiment. As is illustrated in FIG. 1, a wastewater treatment apparatus 10 mainly includes: a source water tank 12 in which wastewater to be treated (source wastewater) is stored; a treatment tank 20 in which the sent wastewater from the source water tank 12 is treated; and a control device 40 which controls each section in the wastewater treatment apparatus 10.

The wastewater which is stored in the source water tank 12 is wastewater containing at least ammonium nitrogen, and may contain nutrient salts of nitrogen, phosphorus, carbon and the like, in addition to the ammonium nitrogen. The source water tank 12 is connected to the treatment tank 20, and is configured so that the wastewater can be supplied to the treatment tank 20 therefrom by the pump 14.

The treatment tank 20 includes a nitrification carrier 22 having the nitrifying bacteria (ammonium oxidation bacterium) accumulated therein dominantly and a denitrification carrier 24 having the anaerobic ammonium-oxidizing bacteria accumulated therein dominantly. Thus, by immobilizing the nitrifying bacteria and the anaerobic ammonium-oxidizing bacteria on different carriers from each other (the nitrification carrier 22 and the denitrification carrier 24), the ratio of bacterial loads of the nitrifying bacteria and the anaerobic ammonium-oxidizing bacteria can be easily controlled through adjusting the volume ratio of the nitrification carrier 22 and the denitrification carrier 24. FIG. 1 shows an example in which the nitrifying bacteria and the anaerobic ammonium-oxidizing bacteria are immobilized on different carriers from each other, but the nitrifying bacteria and the anaerobic ammonium-oxidizing bacteria may be accumulated in the same carrier. For instance, the nitrifying bacteria and the anaerobic ammonium-oxidizing bacteria may be accumulated in the same carrier by the steps of entrapping and immobilizing any one of the nitrifying bacteria and the anaerobic ammonium-oxidizing bacteria in a carrier and attaching the other bacteria on the surface of the carrier.

The nitrifying bacteria accumulated in the nitrification carrier 22 and the anaerobic ammonium-oxidizing bacteria accumulated in the denitrification carrier 24 coexist in the treatment tank 20. Thereby, both of the nitrification reaction due to the nitrification carrier 22 and the denitrification reaction due to the denitrification carrier 24 are allowed to proceed in the treatment tank 20, and can decompose ammonium nitrogen in wastewater to nitrogen gas. Here, the nitrification reaction means a reaction which oxidizes the ammonium nitrogen in the wastewater into nitrite with the use of the nitrifying bacteria, and the denitrification reaction means a reaction which denitrifies the nitrite formed through the nitrification reaction with the anaerobic ammonium-oxidizing bacteria, while using the ammonium nitrogen in the wastewater as a hydrogen donor.

When wastewater is treated using a treatment tank 20 in which nitrifying bacteria which are aerobic bacteria and anaerobic ammonium-oxidizing bacteria which are anaerobic bacteria coexist, it is difficult to rapidly perform wastewater treatment while maintaining the activities of both of the nitrifying bacteria and the anaerobic ammonium-oxidizing bacteria. For instance, when wastewater is treated under an aerobic condition for the purpose of activating the nitrifying bacteria which are aerobic bacteria, the denitrification activity of the anaerobic ammonium-oxidizing bacteria which are anaerobic bacteria decreases.

The present inventors have found that there exist anaerobic ammonium-oxidizing bacteria having a half-saturation constant of 6.1 mgN/L or more with respect to nitrite, in the course of studying a method of rapidly performing wastewater treatment. Anaerobic ammonium-oxidizing bacteria having such a high half-saturation constant have not been conventionally known. Generally known anaerobic ammonium-oxidizing bacteria have too small a half-saturation constant with respect to nitrite to determine because of the precision of an analytical instrument.

Furthermore, the present inventors have acquired the finding that such anaerobic ammonium-oxidizing bacteria can maintain denitrification activity even under a condition in which the amount of dissolved oxygen (DO) is large. This is thought to be because anaerobic ammonium-oxidizing bacteria having a large half-saturation constant have resistance against oxygen.

Based on the above described findings, bacteria used in the present embodiment as the anaerobic ammonium-oxidizing bacteria to be accumulated in the denitrification carrier 24 have a half-saturation constant of 6.1 mgN/L or more with respect to nitrite. The anaerobic ammonium-oxidizing bacteria (bacteria having a half-saturation constant of 6.1 mgN/L or more with respect to nitrite) in the denitrification carrier 24 can maintain the denitrification activity even under a condition in which the amount of dissolved oxygen is large, so the activities of both of the nitrifying bacteria and the anaerobic ammonium-oxidizing bacteria which coexist in the treatment tank 20 can be easily maintained. Accordingly, the method can rapidly perform wastewater treatment. Among them, the anaerobic ammonium-oxidizing bacteria to be accumulated in the denitrification carrier 24 have preferably a half-saturation constant of 15 mgN/L or more with respect to nitrite, from the viewpoint of further rapidly performing wastewater treatment.

The denitrification carrier 24 in which the anaerobic ammonium-oxidizing bacteria having a half-saturation constant of 6.1 mgN/L or more with respect to nitrite are accumulated dominantly can be produced by culturing a carrier containing the anaerobic ammonium-oxidizing bacteria. At this time, it is preferable to culture the carrier continuously for 3 months or more while maintaining the concentration of the nitrite in the culture tank at 20 to 250 mg/L. Thereby cultured anaerobic ammonium-oxidizing bacteria can acquire a half-saturation constant of 6.1 to 40 mgN/L with respect to nitrite, for instance.

The nitrifying bacteria to be accumulated dominantly in the nitrification carrier 22 are preferably bacteria (AH bacteria) having a large half-saturation constant with respect to ammonium. In particular, nitrifying bacteria having a half-saturation constant of 15 mgN/L or more with respect to ammonium are preferable in a point that the nitrifying bacteria do not inhibit a denitrification reaction with anaerobic ammonium-oxidizing bacteria, as will be described later.

When nitrifying bacteria (AL bacteria) having a low half-saturation constant with respect to ammonium are used, ammonium in the treatment tank is excessively consumed in the nitrification reaction, which may affect the denitrification reaction with the anaerobic ammonium-oxidizing bacteria. By using nitrifying bacteria having a half-saturation constant of 15 mgN/L or more with respect to ammonium, an excessive consumption of ammonium in the nitrification reaction is prevented and the denitrification reaction with the anaerobic ammonium-oxidizing bacteria can be allowed to stably proceed.

The nitrification carrier 22 in which the nitrifying bacteria having a half-saturation constant of 15 mgN/L or more with respect to ammonium are accumulated dominantly can be produced by culturing a carrier containing the nitrifying bacteria, for instance. At this time, it is preferable to culture the carrier continuously while maintaining the concentration of the ammonium in the culture tank at 50 mg/L or more. Thereby cultured nitrifying bacteria (AH bacteria) can acquire a half-saturation constant of 10 to 60 mgN/L with respect to ammonium, for instance.

The nitrification carrier 22 is not particularly limited as long as the nitrifying bacteria are immobilized on the nitrification carrier 22, and may be immobilization pellets or a contact filter medium. The nitrifying bacteria to be immobilized on the nitrification carrier 22 may employ bacteria separated from microorganisms in activated sludge or the like. The nitrification carrier 22 may also employ activated sludge containing microbial colonies in which the nitrifying bacteria are proliferated dominantly.

In addition, entrapping immobilization pellets which have the nitrifying bacteria entrapped and immobilized in its inner part are preferably used as the immobilization pellets type of the nitrification carrier 22. The entrapping immobilization pellets, if being used, can reliably control the bacterial load, because an exfoliation of the biofilm does not occur, which can occur in the case of the attachment immobilization pellets. In addition, when the entrapping immobilization pellets are used, the return of sludge is unnecessary in the acclimation step, so the bacteria can be comparatively easily acclimated.

The immobilizing material of the nitrification carrier 22 is not limited in particular, but includes gels of polyvinyl alcohol, alginic acid, polyethylene glycol and the like, and plastics such as cellulose, polyester, polypropylene and polyvinyl chloride, for instance. The shape of the nitrification carrier 22 may be, for instance, a spherical shape, a cylindrical shape or a cubic shape, and may be formed into a porous shape, a honeycomb shape or a sponge shape. Alternatively, a granule carrier with the use of the self-granulation of a microorganism may be used as the nitrification carrier 22. Contact filter media which can be used for the nitrification carrier 22 can include those made from polyvinyl chloride and polyethylene.

The denitrification carrier 24 is not limited in particular as long as the anaerobic ammonium-oxidizing bacteria are immobilized in the denitrification carrier 24, and may be immobilization pellets or a contact filter medium.

In addition, the immobilization pellets to be used for the denitrification carrier 24 may be entrapping immobilization pellets which have the anaerobic ammonium-oxidizing bacteria entrapped and immobilized in their inner part, or attachment depositing immobilization pellets which have the anaerobic ammonium-oxidizing bacteria attached and immobilized on their surface. Among them, the entrapping immobilization pellet is preferably used as the denitrification carrier 24. The entrapping immobilization pellets, if being used, can reliably control the bacterial load, because an exfoliation of the biofilm does not occur, which can occur in the case of the attachment immobilization pellets. The entrapping immobilization pellets can reliably hold bacteria in the treatment tank, and accordingly is suitable for a carrier for immobilizing precious anaerobic ammonium-oxidizing bacteria therein which are obtained by culture. Furthermore, when the entrapping immobilization pellets are used, the return of sludge is unnecessary in the acclimation step, so the bacteria can be comparatively easily acclimated.

The immobilizing material of the denitrification carrier 24 is not limited in particular, but includes gels of polyvinyl alcohol, alginic acid, polyethylene glycol and the like, and plastics such as cellulose, polyester, polypropylene and polyvinyl chloride, for instance. The shape of the denitrification carrier 24 may be, for instance, a spherical shape, a cylindrical shape or a cubic shape, and may be formed into a porous shape, a honeycomb shape or a sponge shape. Alternatively, a granule carrier with the use of the self-granulation of a microorganism may be used as the denitrification carrier 24. Contacting filter media which can be used for the denitrification carrier 24 can include those made from polyvinyl chloride and polyethylene.

The total volume of the nitrification carrier 22 and the denitrification carrier 24 is preferably 10 to 40% of the volume of the wastewater in the treatment tank 20, and more preferably is 15 to 25% of the volume. The volume fraction (dominance) of the denitrification carrier 24 with respect to the total volume of the nitrification carrier 22 and the denitrification carrier 24 in the treatment tank 20 is preferably 25 to 65%. In particular, when the water temperature is high (when water temperature is 25 to 37° C., for instance), the volume fraction (dominance) of the denitrification carrier 24 is preferably set to 25 to 40%.

As is illustrated in FIG. 1, the treatment tank 20 is provided with a sensor 26 which measures the quality of the wastewater in the treatment tank 20. The sensor 26 has such a structure as to be capable of measuring, for instance, the concentrations of ammonium, nitrite and nitrate, the quantity of dissolved oxygen, and pH. The result measured by the sensor 26 is sent to the control device 40, and each section in the wastewater treatment apparatus 10 is controlled on the basis of this measurement result.

The treatment tank 20 is provided with an air-diffusing device 28, and is structured so that air is supplied from a blower 30 through the air-diffusing device 28. Thereby, the air-diffusing device 28 aerates and stirs the wastewater in the treatment tank 20, and simultaneously can supply dissolved oxygen into the wastewater.

The control device 40 controls the blower 30 so that the amount of the dissolved oxygen in the wastewater in the treatment tank 20 is preferably 0.5 to 4.0 mg/L (more preferably 1.0 to 3.0 mg/L).

The concentration of the nitrite in the treatment tank 20 is preferably maintained at 15 to 250 mg/L, and more preferably maintained at 20 to 100 mg/L. In addition, the concentration of the ammonium in the treatment tank 20 is preferably maintained at 3 mg/L or more, and more preferably maintained at 5 mg/L.

By maintaining the nitrite concentration and the ammonium concentration in the treatment tank 20 within the above described range, the rate of wastewater treatment can be further enhanced.

The nitrite concentration and the ammonium concentration in the treatment tank 20 can be adjusted by allowing the control device 40 to control the pump 14 so as to change the retention time (hydrological retention time) of the wastewater in the treatment tank 20.

The wastewater treatment method according to one embodiment of the present invention was described in the above, but the present invention is not limited thereto, and of course, can be improved or modified in various ways within a range that does not deviate from the gist of the present invention.

For instance, in an example described in the above embodiment, wastewater is treated by using the nitrifying bacteria and the anaerobic ammonium-oxidizing bacteria which have been accumulated in the nitrification carrier 22 and the denitrification carrier 24, but the wastewater may be treated with activated sludge containing the nitrifying bacteria and the anaerobic ammonium-oxidizing bacteria.

Figure 2:
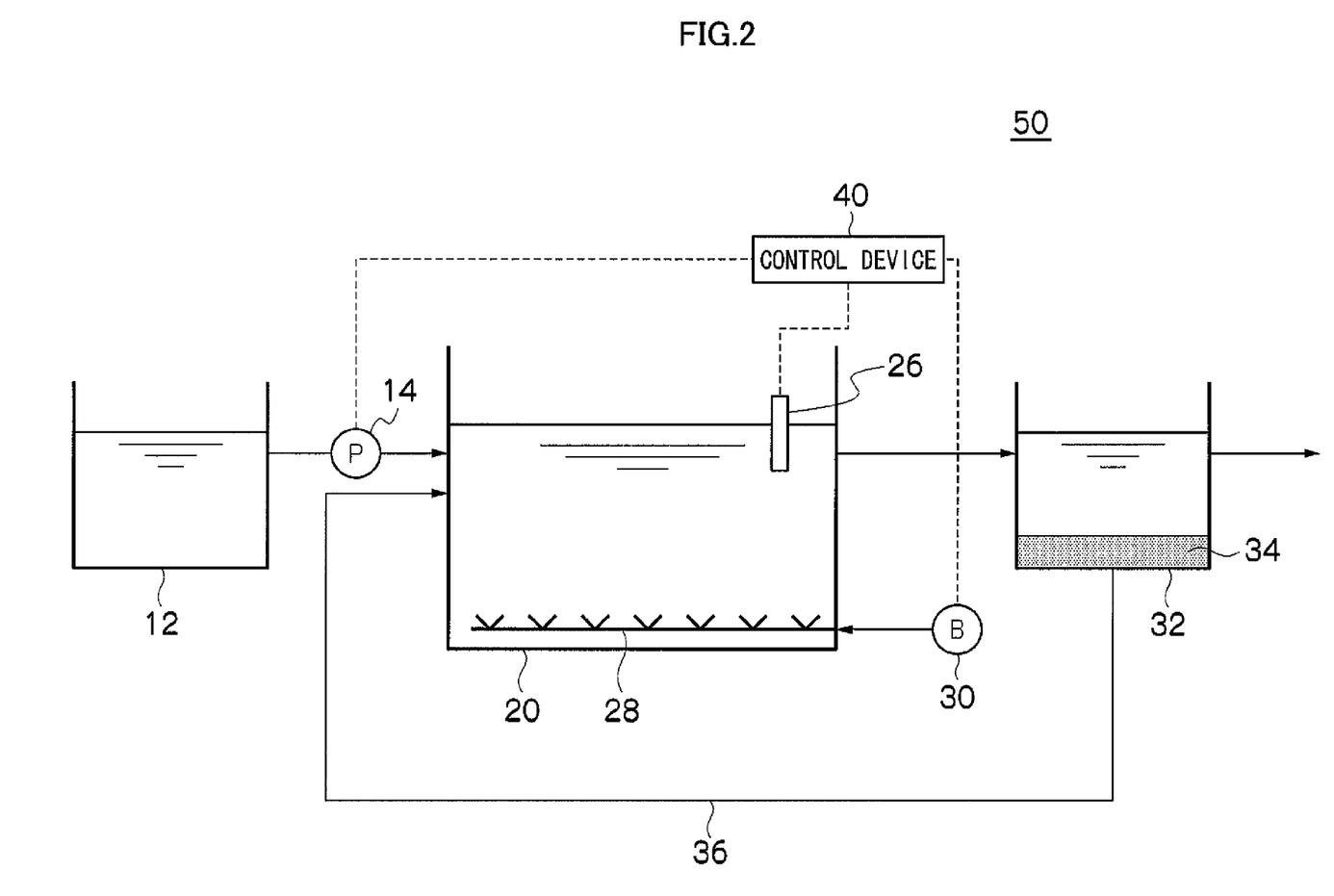
FIG. 2 is a block diagram illustrating another example of the wastewater treatment apparatus.

FIG. 2 is a block diagram illustrating one example of a wastewater treatment apparatus which treats wastewater with activated sludge containing the nitrifying bacteria and the anaerobic ammonium-oxidizing bacteria. In FIG. 2, the same reference numerals will be put on common components to the wastewater treatment apparatus 10 illustrated in FIG. 1, and the description is omitted here.

The wastewater treatment apparatus 50 illustrated in FIG. 2 is different from the wastewater treatment apparatus 10 in that the wastewater is not treated with the nitrification carrier 22 and the denitrification carrier 24 but is treated with activated sludge 34 containing the nitrifying bacteria and the anaerobic ammonium-oxidizing bacteria.

The activated sludge 34 is circulated between the treatment tank 20 and a sedimentation tank 32 provided in the rear stage of the treatment tank 20, through a returned sludge pipe 36. The nitrifying bacteria and the anaerobic ammonium-oxidizing bacteria which have been accumulated in the activated sludge 34 coexist in the treatment tank 20. Thereby, both of a nitrification reaction with the nitrifying bacteria and a denitrification reaction with the anaerobic ammonium-oxidizing bacteria are allowed to proceed in the treatment tank 20 to decompose ammonium nitrogen in the wastewater to nitrogen gas.

As in the above described embodiment, bacteria having a half-saturation constant of 6.1 mgN/L or more (preferably 15 mgN/L or more) with respect to nitrite are used for the anaerobic ammonium-oxidizing bacteria in the activated sludge 34. Such anaerobic ammonium-oxidizing bacteria can maintain the denitrification activity even under a condition in which the amount of dissolved oxygen is large, so the activities of both of the nitrifying bacteria and the anaerobic ammonium-oxidizing bacteria which coexist in the treatment tank 20 can be easily maintained. Accordingly, the method can rapidly perform wastewater treatment.

The nitrifying bacteria in the activated sludge 34 are preferably bacteria (AH bacteria) having a high half-saturation constant with respect to ammonium, as in the above described embodiment. In particular, nitrifying bacteria having a half-saturation constant of 15 mgN/L or more with respect to ammonium are preferable in that the nitrifying bacteria do not inhibit the denitrification reaction with the anaerobic ammonium-oxidizing bacteria.

In addition, it is preferable to maintain the amount of dissolved oxygen in the wastewater in the treatment tank 20 at 0.5 to 4.0 mg/L (more preferably at 1.0 to 3.0 mg/L), to maintain the concentration of the nitrite at 15 to 250 mg/L (more preferably at 20 to 100 mg/L), and to maintain the concentration of ammonium at 3 mg/L or more (more preferably at 5 mg/L or more), by allowing the control device 40 to control a pump 14 and a blower 30.

EXAMPLES

A feature of the present invention will now be described more specifically below with reference to Examples. However, the scope of the present invention should not be restrictively interpreted by the specific examples which will be described below.

Example 1

Preparation of Nitrification Carrier 22

Figure 3:
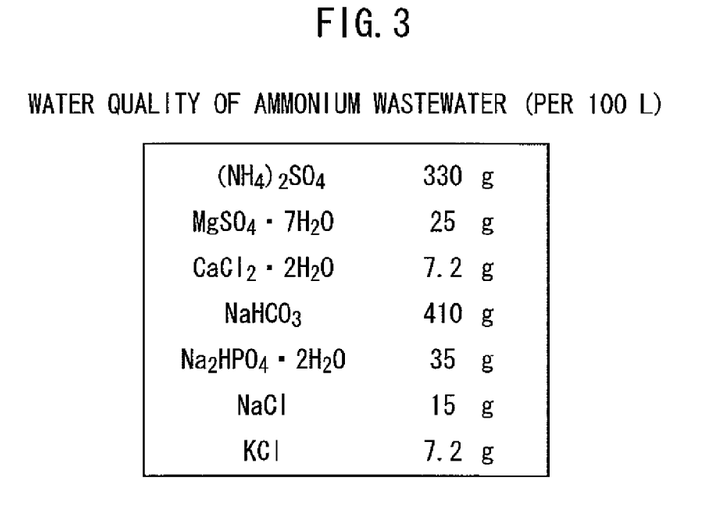
FIG. 3 is a table showing the water quality of an ammonium wastewater which has been used for acclimating a nitrification carrier.

An activated sludge containing nitrifying bacteria was entrapped and immobilized with a polyethylene glycol-based gel which had been molded into a cube of 3 mm square. These entrapping immobilization pellets in an amount of 0.2 L are charged into a cylindrical reactor (culture tank) having a volumetric capacity of 2 L. A nitrification carrier 22 was prepared by making ammonium wastewater (inorganic synthetic wastewater) flow into this reactor and acclimating the nitrifying bacteria at a temperature maintained at 30° C. in the reactor for 1 month. FIG. 3 is a table showing the water quality of the ammonium wastewater used for acclimating nitrifying bacteria.

When the nitrifying bacteria were acclimated, the wastewater was aerated and stirred, the amount of dissolved oxygen (DO) in the reactor was maintained at 2 to 4 mg/L, and also the pH was maintained at 7.5 by the addition of a 5% solution of sodium bicarbonate. In an early period after the acclimation was started, the flow rate of the ammonium wastewater was controlled so that the retention time (hydrological retention time) were 24 hours, and then the retention time was shortened and the load was increased according to the increase in the activity of the nitrifying bacteria. The above load was controlled so that the concentration of the ammonium in the reactor were 50 mg/L or more.

Figure 4:
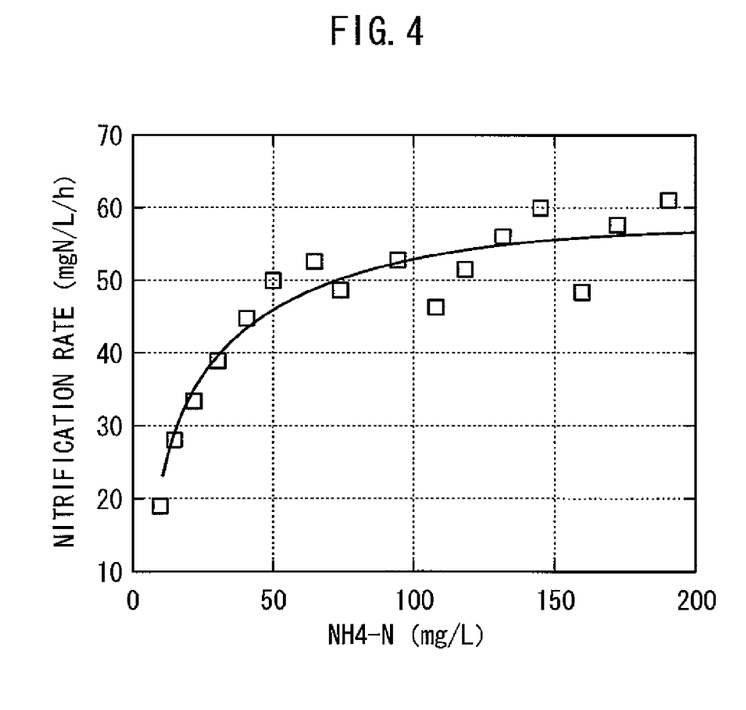
FIG. 4 is a graph showing the relationship between the concentration of ammonium and the nitrification rate of acclimated nitrifying bacteria.

FIG. 4 is a graph showing the relationship between the nitrification rate of the nitrification carrier 22 which has been prepared in the above described procedure and the concentration of the ammonium. As a result of having approximated the graph of FIG. 4 according to the Michaelis-Menten equation, the obtained half-saturation constant of the nitrification carrier 22 with respect to ammonium was 20 mgN/L.

<Preparation of Denitrification Carrier 24>

Anaerobic ammonium-oxidizing bacteria were entrapped and immobilized with a polyethylene-glycol-based gel which had been molded into a cube of 3 mm square. These entrapping immobilization pellets in an amount of 0.2 L are charged into a cylindrical reactor (culture tank) having a volumetric capacity of 2 L. In addition, the reactor used had a structure of preventing air from entering the inner part, and was provided with a stirrer. A denitrification carrier 24 was prepared by making a synthetic wastewater flow into this reactor and acclimating the anaerobic ammonium-oxidizing bacteria at a temperature maintained at 30° C. in the reactor for 6 months.

Figure 5:
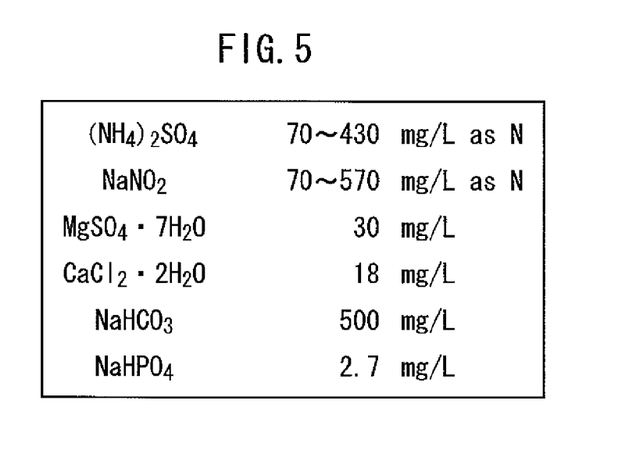
FIG. 5 is a table showing the water quality of a synthetic wastewater which has been used for acclimating a denitrification carrier.

FIG. 5 is a table showing the water quality of the synthetic wastewater which was used for acclimating the denitrification carrier.

When the denitrification carrier was acclimated, the pH of the wastewater was maintained at 7.5 by the addition of an HCl solution (0.2 N). In addition, in an early period after the acclimation was started, the flow rate of the ammonium wastewater was controlled so that the retention time (hydrological retention time) were 12 hours. Furthermore, the load was controlled so that the concentration of the nitrite in the reactor were 20 to 250 mg/L.

Figure 6:
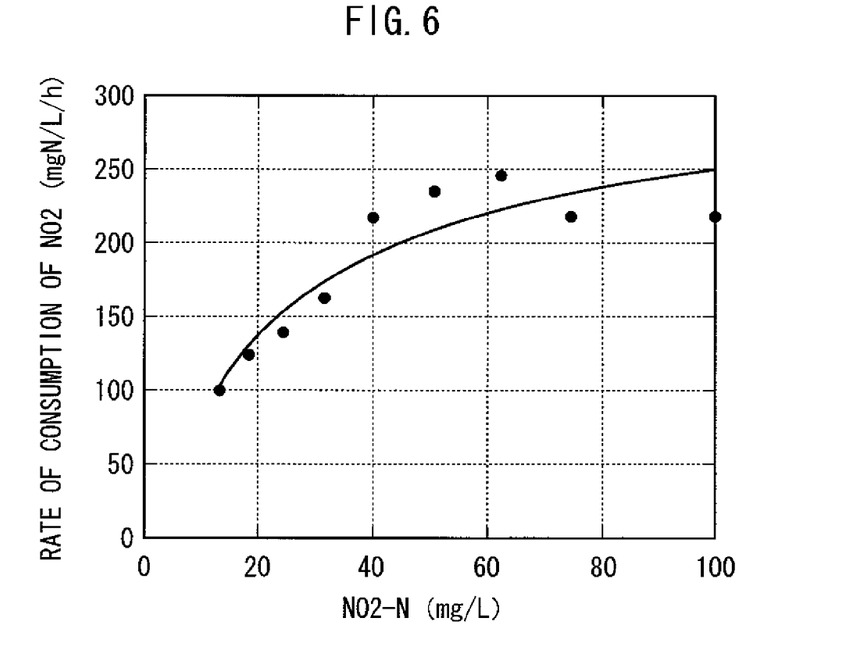
FIG. 6 is a graph showing a relationship between the concentration of nitrite and the denitrification rate of acclimated anaerobic ammonium-oxidizing bacteria.

FIG. 6 is a graph showing a relationship between the denitrification rate (rate of consumption of nitrite) of the denitrification carrier 24 which was prepared in the above described procedure and the concentration of nitrite. As a result of having approximated the graph of FIG. 6 according to the Michaelis-Menten equation, the obtained half-saturation constant of the denitrification carrier 24 with respect to nitrite was 28 mgN/L.

<Examination for Nitrification Denitrification>

An examination of wastewater treatment for ammonium wastewater was conducted by using the nitrification carrier 22 and the denitrification carrier 24 which were prepared in the above described procedure. The nitrification carrier 22 and the denitrification carrier 24 each in an amount of 0.2 L were charged into the same reactor as was used for the preparation of the nitrification carrier 22. The synthetic wastewater having the water quality shown in FIG. 3 was made to flow into this reactor, and the wastewater was treated for 1 month.

While the wastewater was treated, the amount of the dissolved oxygen in the reactor was maintained at 1.0 to 3.0 mg/L, and the amount of the wastewater flowing into the reactor was controlled so that the retention time of the wastewater were 8 hours.

Figure 7:
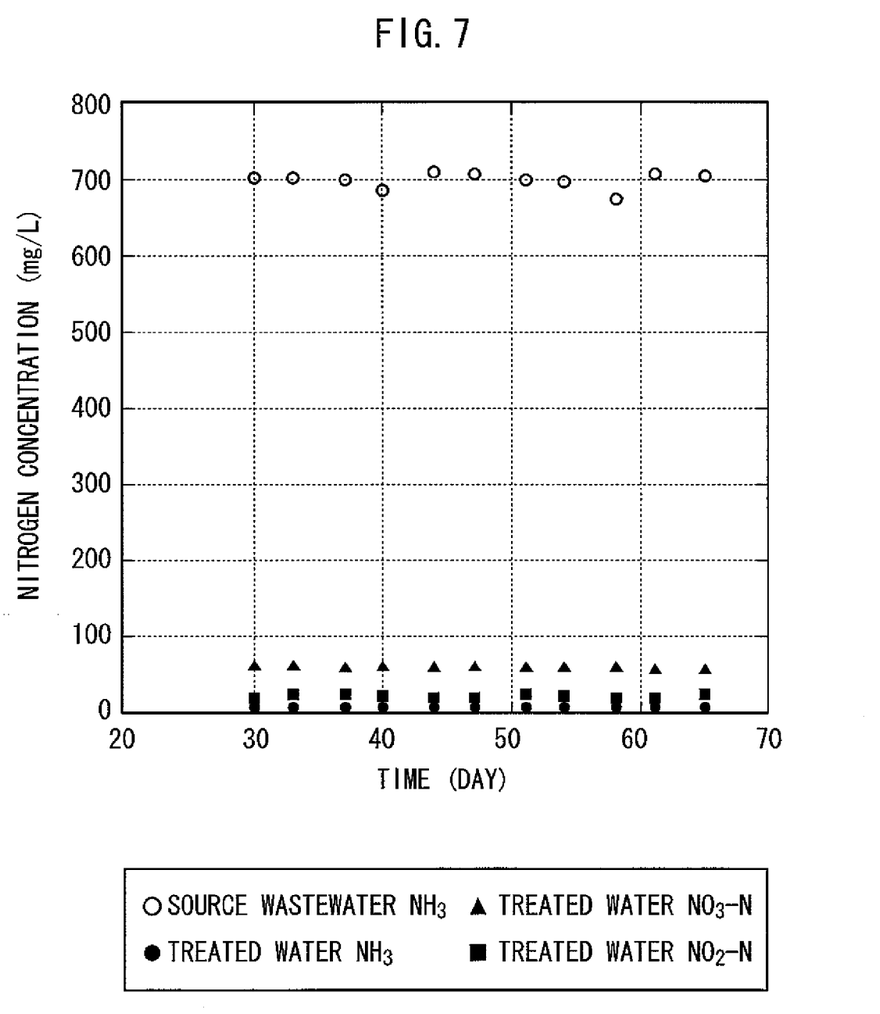
FIG. 7 is a graph showing the result of a wastewater treatment experiment.

FIG. 7 is a graph showing the water quality of a treated water which was sampled after 1 month after the start of the wastewater treatment. As is understood from FIG. 7, the ammonium in the wastewater was almost completely treated, and the average concentration of the ammonium in the treated water was 6.2 mg/L. The nitrite was almost completely treated. The average concentration of nitrite in the treated water was 22.4 mg/L, and the average concentration of nitrate which was formed by the anaerobic ammonium oxidation reaction was 65 mg/L. The nitrogen-removal rate at this time was 2.0 kg-N/m$^{-3}$/day$^{-1}$.

Thus, it was confirmed that the wastewater treatment method according to the present invention could stably and rapidly perform wastewater treatment.

Example 2

Preparation of Denitrification Carriers 24 Having Various Half-Saturation Constants Activated sludges containing three types of anaerobic ammonium-oxidizing bacteria were obtained by accumulating and culturing the anaerobic ammonium-oxidizing bacteria with the use of sludges obtained from a sewage treatment plant, a treatment plant of fermentation wastewater in the livestock industry, and a treatment plant of wastewater in a food factory. The method described in "Acclimation of anaerobic ammonium-oxidizing bacteria by continuous culture system, Proceedings of 38th Annual Meeting of Japan Society on Water Environment, p. 372 (2004))." was used as the above accumulation and culture method.

These activated sludges were entrapped and immobilized as in Example 1, and three types of denitrification carriers 24

(carriers A to C) were prepared by acclimating the respective anaerobic ammonium-oxidizing bacteria. Then, the half-saturation constants of the respective denitrification carriers with respect to nitrite were measured.

Figure 8:
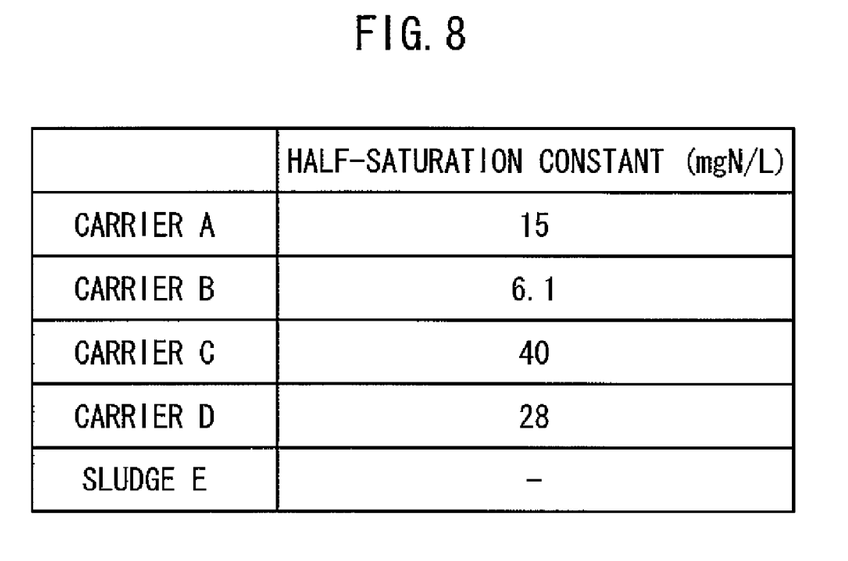
FIG. 8 is a table showing the half-saturation constant of acclimated anaerobic ammonium-oxidizing bacteria with respect to nitrite.

FIG. 8 is a table showing the measurement result of the half-saturation constants. In FIG. 8, a carrier D means the denitrification carrier 24 which was prepared in Example 1. In addition, a sludge E is a sludge prepared by acclimating the anaerobic ammonium-oxidizing bacteria while maintaining the concentration of the nitrite in a culture tank at 10 mg/L or less, and the half-saturation constant was measured not in a state of making the anaerobic ammonium-oxidizing bacteria entrapped and immobilized in a gel, but in a state of making the anaerobic ammonium-oxidizing bacteria attached on a nonwoven cloth.

It was found from FIG. 8 that the carriers A to D each had a half-saturation constant of 15 to 40 mgN/L with respect to nitrite. On the other hand, the sludge E showed a tendency to have a half-saturation constant with respect to nitrite in the range of 0.01 to 1 mgN/L, but cannot be determined because of the precision of an analytical instrument.

<Influence of Amount of Dissolved Oxygen>

The above described carriers A to D were subjected to a wastewater treatment operation by using the same reactor as that used in preparing the denitrification carrier of Example 1 and making synthetic wastewater (synthetic wastewater having water quality shown in FIG. 5) flow into the reactor. The amount of the denitrification carrier to be charged into the reactor was set to 0.2 L. The operation was continued for about 1 month on the condition that the ammonium concentration and the nitrite concentration in the wastewater of FIG. 5 were 150 mgN/L and 220 mgN/L, respectively, and DO was 0 mg/L, and stable data was obtained. Then, DO was increased to 1 to 3 mg/L, and the change in the nitrogen-removal rate at this time was confirmed. The water temperature was set to 30° C., and the HRT was set to 4.8 hours.

The sludge E was tested by using a reactor having a volume of 0.2 L, which is described in "High nitrogen-removal rate with the use of anaerobic ammonium oxidation method, Lectures in Japan Society on Water Environment 7th Symposium, p. 125-126 (2004)", and by packing a nonwoven cloth into the reactor, which had made the anaerobic ammonium-oxidizing bacteria attached in the inner part. The concentrations of NH4-N and NO2-N in the source water were each set to 50 mg/L. The water temperature was set to 30° C., and the HRT was set to 4 hours. The operation was continued for about 1 month and stable data was obtained. Then, DO was increased to 1 to 3 mg/L, and the change in the nitrogen-removal rate at this time was confirmed.

As a result, in the case of the carriers A to D, there was no change in the nitrogen-removing performance and no influence of the amount of the dissolved oxygen was found. On the other hand, in the case of the sludge E, the activity remarkably decreased when the amount of the dissolved oxygen in the source water was adjusted to 1 to 3 mg/L, and the activity completely disappeared one week after the amount of the dissolved oxygen had been changed.

From the result, it was proved that anaerobic ammonium-oxidizing bacteria having a half-saturation constant of 6.1 mgN/L or more with respect to nitrite are not easily affected by the dissolved oxygen.

What is claimed is:

1. A wastewater treatment method for treating wastewater containing ammonium nitrogen, comprising the steps of:
   oxidizing the ammonium nitrogen in the wastewater to nitrite with nitrifying bacteria in a treatment tank in which the nitrifying bacteria and anaerobic ammonium-oxidizing bacteria having a half-saturation constant of 6.1 mgN/L or more with respect to nitrite coexist; and
   denitrifying the nitrite formed through the oxidation of the ammonium nitrogen, with the anaerobic ammonium-oxidizing bacteria in the treatment tank, while using the ammonium nitrogen contained in the wastewater as a hydrogen donor.

2. The wastewater treatment method according to claim 1, wherein the concentration of the nitrite in the treatment tank is maintained at 15 mg/L or more and 250 mg/L or less.

3. The wastewater treatment method according to claim 1, wherein the concentration of ammonium in the treatment tank is maintained at 3 mg/L or more.

4. The wastewater treatment method according to claim 2, wherein the concentration of ammonium in the treatment tank is maintained at 3 mg/L or more.

5. The wastewater treatment method according to claim 1, wherein the nitrifying bacteria have a half-saturation constant of 15 mgN/L or more with respect to ammonium.

6. The wastewater treatment method according to claim 4, wherein the nitrifying bacteria have a half-saturation constant of 15 mgN/L or more with respect to ammonium.

7. The wastewater treatment method according to claim 1, wherein the nitrifying bacteria and the anaerobic ammonium-oxidizing bacteria are immobilized on different carriers from each other.

8. The wastewater treatment method according to claim 6, wherein the nitrifying bacteria and the anaerobic ammonium-oxidizing bacteria are immobilized on different carriers from each other.

9. The wastewater treatment method according to claim 7, wherein the carrier is entrapping immobilization pellets.

10. The wastewater treatment method according to claim 8, wherein the carrier is entrapping immobilization pellets.

11. A wastewater treatment apparatus comprising:
   a treatment tank in which nitrifying bacteria and anaerobic ammonium-oxidizing bacteria having a half-saturation constant of 6.1 mgN/L or more with respect to nitrite coexist.

12. The wastewater treatment apparatus according to claim 11, wherein the nitrifying bacteria have a half-saturation constant of 15 mgN/L or more with respect to ammonium.

13. The wastewater treatment apparatus according to claim 11, wherein the nitrifying bacteria and the anaerobic ammonium-oxidizing bacteria are immobilized on different carriers from each other.

14. The wastewater treatment apparatus according to claim 12, wherein the nitrifying bacteria and the anaerobic ammonium-oxidizing bacteria are immobilized on different carriers from each other.

15. The wastewater treatment apparatus according to claim 13, wherein the carrier is entrapping immobilization pellets.

16. The wastewater treatment apparatus according to claim 14, wherein the carrier is entrapping immobilization pellets.

* * * * *